United States Patent
Jones

(10) Patent No.: US 10,450,071 B2
(45) Date of Patent: Oct. 22, 2019

(54) AIRCRAFT PASSENGER SEAT MECHANISM

(71) Applicant: British Airways Plc, Harmondsworth, West Drayton (GB)

(72) Inventor: Gareth Evan Lyn Jones, Bath (GB)

(73) Assignee: British Airways PLC, West Drayton (GB)

( * ) Notice: Subject to any disclaimer, the term of this patent is extended or adjusted under 35 U.S.C. 154(b) by 1 day.

(21) Appl. No.: 15/741,040

(22) PCT Filed: Jun. 29, 2016

(86) PCT No.: PCT/GB2016/051948
§ 371 (c)(1),
(2) Date: Dec. 29, 2017

(87) PCT Pub. No.: WO2017/001845
PCT Pub. Date: Jan. 5, 2017

(65) Prior Publication Data
US 2018/0194474 A1    Jul. 12, 2018

(30) Foreign Application Priority Data
Jun. 30, 2015    (GB) .................................. 1511467.1

(51) Int. Cl.
*B60N 2/12*    (2006.01)
*B60N 2/22*    (2006.01)
*B60N 2/34*    (2006.01)
*B64D 11/06*    (2006.01)

(52) U.S. Cl.
CPC ...... *B64D 11/064* (2014.12); *B64D 11/06395* (2014.12)

(58) Field of Classification Search
CPC ..................... B64D 11/06395; B64D 11/064
USPC ........... 297/118, 317, 322, 341, 342, 354.12, 297/354.13
See application file for complete search history.

(56) References Cited

U.S. PATENT DOCUMENTS

| 4,205,877 | A | * | 6/1980 | Ettridge | B60N 2/2821 297/322 X |
| 4,362,336 | A | * | 12/1982 | Zapf | A47C 7/46 297/317 |
| 4,364,603 | A | * | 12/1982 | Johnson | A47C 1/0352 297/317 |
| 4,504,090 | A | * | 3/1985 | Goldman | A47C 1/03255 297/317 |
| 4,637,652 | A | | 1/1987 | Bergenwall | |

(Continued)

FOREIGN PATENT DOCUMENTS

WO    01/32506 A1    5/2001
WO    2007/072045 A2    6/2007
(Continued)

*Primary Examiner* — Rodney B White
(74) *Attorney, Agent, or Firm* — Sterne, Kessler, Goldstein & Fox P.L.L.C.

(57) ABSTRACT

An aircraft passenger seat comprises a seat back and a seat pan, the seat pan being pivotally connected at or around a forward end thereof to a seat frame at a first pivot point, and at or around a rearward end thereof to a lower end of the seat back at a second pivot point. The seat back has an extension extending beyond the second pivot point and engaging a guide track in or connected to the seat frame, and a reclining actuator for driving the extension along the guide track so as to adjust the reclining of the seat.

17 Claims, 9 Drawing Sheets

(56) References Cited

U.S. PATENT DOCUMENTS

| | | | | |
|---|---|---|---|---|
| 4,877,291 | A * | 10/1989 | Taylor | A47C 1/03255 297/322 X |
| 5,108,148 | A * | 4/1992 | Henke | A47C 1/035 297/317 |
| 6,030,043 | A * | 2/2000 | Habedank | B60N 2/067 297/342 X |
| 6,059,364 | A * | 5/2000 | Dryburgh | A47C 1/0352 297/354.13 |
| 6,305,644 | B1 * | 10/2001 | Beroth | B64D 11/00 297/354.13 X |
| 6,340,208 | B1 * | 1/2002 | Habedank | B60N 2/02 297/322 |
| 6,412,870 | B1 * | 7/2002 | Higgins | B60N 2/34 297/342 |
| 6,641,214 | B2 * | 11/2003 | Veneruso | B60N 2/0232 297/317 X |
| 6,679,556 | B1 * | 1/2004 | Alvestad | A47C 20/08 297/317 |
| 6,692,069 | B2 * | 2/2004 | Beroth | A47C 1/0352 297/118 X |
| 6,742,840 | B2 * | 6/2004 | Bentley | B60N 2/22 297/317 X |
| 6,769,739 | B2 * | 8/2004 | Salzer | B60N 2/34 297/354.13 |
| 7,374,245 | B2 * | 5/2008 | Tanaka | B60N 2/0232 297/341 X |
| 7,469,861 | B2 * | 12/2008 | Ferry | B60N 2/206 244/118.6 |
| 7,523,888 | B2 * | 4/2009 | Ferry | B60N 2/206 297/354.13 X |
| 7,637,571 | B2 * | 12/2009 | Okano | B60N 2/1821 297/341 X |
| 7,997,654 | B2 * | 8/2011 | Ferry | B60N 2/206 297/342 |
| 8,113,573 | B2 * | 2/2012 | Lawson | B64D 11/06 297/118 |
| 8,303,036 | B2 * | 11/2012 | Hankinson | B64D 11/06 297/317 |
| 8,376,458 | B2 * | 2/2013 | Meister | B64D 11/06 297/341 X |
| 8,403,415 | B2 * | 3/2013 | Lawson | B64D 11/06 297/322 X |
| 8,419,123 | B2 * | 4/2013 | Hankinson | B64D 11/06 297/118 |
| 8,439,435 | B2 * | 5/2013 | Gaither | B60N 2/242 297/317 X |
| 8,523,280 | B2 * | 9/2013 | Kuno | B60N 2/2209 297/322 |
| 8,540,313 | B2 * | 9/2013 | Fujita | B60N 2/028 297/317 X |
| 8,579,375 | B2 * | 11/2013 | Marais | B64D 11/06 297/341 |
| 8,616,643 | B2 * | 12/2013 | Darbyshire | B64D 11/06 297/341 X |
| 8,733,840 | B2 * | 5/2014 | Westerink | B60N 2/1625 297/317 X |
| 8,827,365 | B2 * | 9/2014 | Gaither | B60N 2/242 297/342 |
| 9,061,766 | B2 * | 6/2015 | Kladde | B64D 11/06 |
| 9,073,453 | B2 | 7/2015 | Erhel | |
| 9,227,729 | B2 * | 1/2016 | Udriste | B64D 11/06 |
| 9,266,613 | B2 | 2/2016 | Henshaw et al. | |
| 9,452,838 | B2 * | 9/2016 | Meister | B64D 11/06 |
| 2009/0195040 | A1 * | 8/2009 | Birkbeck | A47C 1/03255 297/317 |
| 2010/0032994 | A1 * | 2/2010 | Lawson | B64D 11/06 297/86 |
| 2014/0300161 | A1 * | 10/2014 | Beroth | B64D 11/06 297/340 |
| 2015/0284087 | A1 | 10/2015 | Henshaw | |
| 2017/0021930 | A1 * | 1/2017 | Henshaw | B64D 11/064 |

FOREIGN PATENT DOCUMENTS

| | | |
|---|---|---|
| WO | 2008/041040 A1 | 4/2008 |
| WO | 2008/122761 A1 | 10/2008 |
| WO | 2015/008082 A2 | 1/2015 |

\* cited by examiner

AIRCRAFT PASSENGER SEAT MECHANISM

The present invention relates to an aircraft passenger seat mechanism, particularly but not exclusively for an aircraft sleeper seat convertible into a substantially flat bed.

BACKGROUND TO THE INVENTION

An aircraft passenger seat mechanism is disclosed in WO 2007/072045, comprising a single actuator for driving the seat forwards and backwards, and a cam mechanism and guide track for controlling the angle of the seat back and the seat pan as the seat is driven.

STATEMENTS OF THE INVENTION

Aspects of the present invention are defined by the accompanying claims.

BRIEF DESCRIPTION OF THE DRAWINGS

Embodiments of the invention will now be described with reference to the drawings identified below.

DETAILED DESCRIPTION OF THE EMBODIMENTS

Terminology

In this section, 'horizontal' and 'vertical' are defined with reference to the floor of the passenger seating area of the aircraft. As is well-known to the skilled person, the angle of the floor relative to the gravitational horizontal is determined by the pitch of the aircraft, which is about 15° during take-off and landing, and about 3° in level flight. When discussing an individual seat, 'forward' and 'rearward' are defined with reference to the direction in which the passenger faces when seated, while in the context of the layout of seats, 'forward' and 'rearward' are defined with reference to the longitudinal direction of the aircraft cabin. The lateral direction is defined as being generally horizontal, and perpendicular to the longitudinal direction.

Seat Configurations

The desired configurations of a seat frame of an aircraft passenger seat are illustrated in FIGS. 1a to 1d. In the upright configuration shown in FIG. 1a, the seat back 3 is at its most upright position, for example being reclined at between 10° and 20°. The seat pan 4 is at its most rearward position and is preferably slightly reclined, for example by between 0° and 10°. The upright configuration is suitable for sitting upright, for example while the passenger is working or eating. The seat pan 4 is at about 10° to the horizontal, while the seat back 3 is between about 15-20° to the vertical.

Figure 1B:
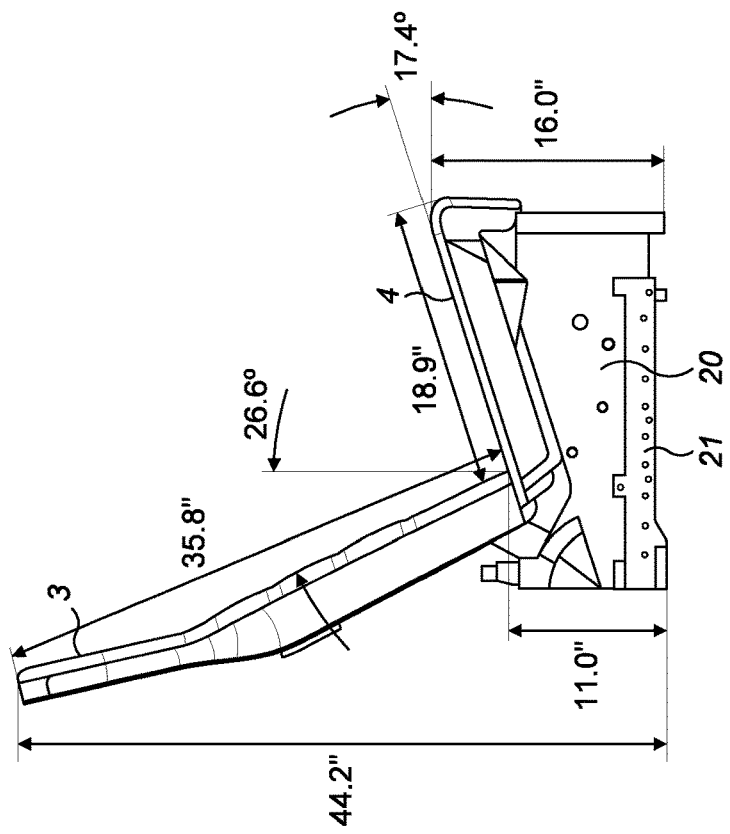
FIGS. 1a to 1d are schematic side elevations of a seat frame respectively in upright, TTOL, reclining and bed positions.
Figure 1A:
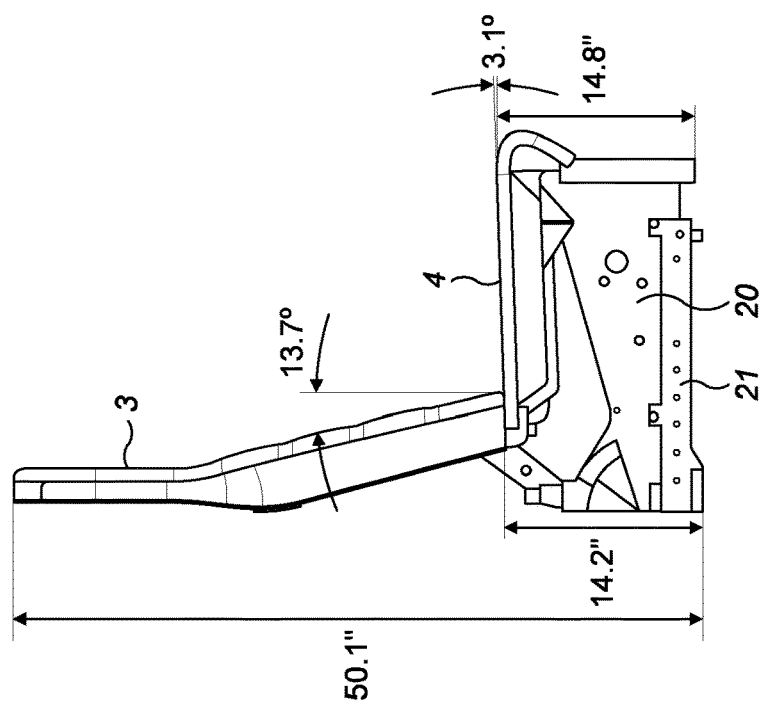

In the TTOL configuration shown in FIG. 1b, the seat back 3 is more reclined and the seat pan 4 has moved forward and is more inclined relative to its position in the upright configuration. The angle of reclining of the seat back 3 is about 25-30° to the vertical and the angle of recline of the seat pan 4 is about 15-20° to the horizontal. One advantage of this configuration is to avoid tipping the passenger out of the seat 1 during take-off, where the seat 1 faces towards the rear of the aircraft. The seat 1 meets the required safety standards for takeoff and landing, such as the 16 g test, in this configuration.

Figure 1C:
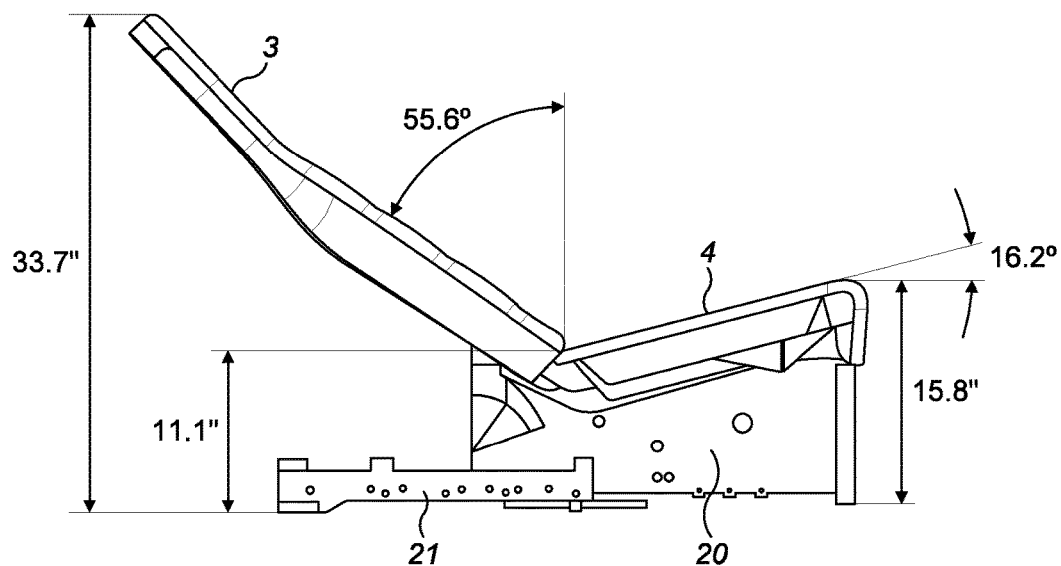

In the reclined configuration as shown in FIG. 1c, the seat back 3 is reclined by a large angle, such as 40-70°, to the vertical, and the seat pan 4 has moved forward relative to its position in the TTOL configuration. The angle of reclining of the seat back 3 and the corresponding forward movement of the seat pan 4 may be varied under control of the passenger, to provide the desired degree of reclining, but the angle of the seat pan 4 remains substantially constant. The reclined configuration is suitable for resting and/or in-flight entertainment.

Figure 1D:
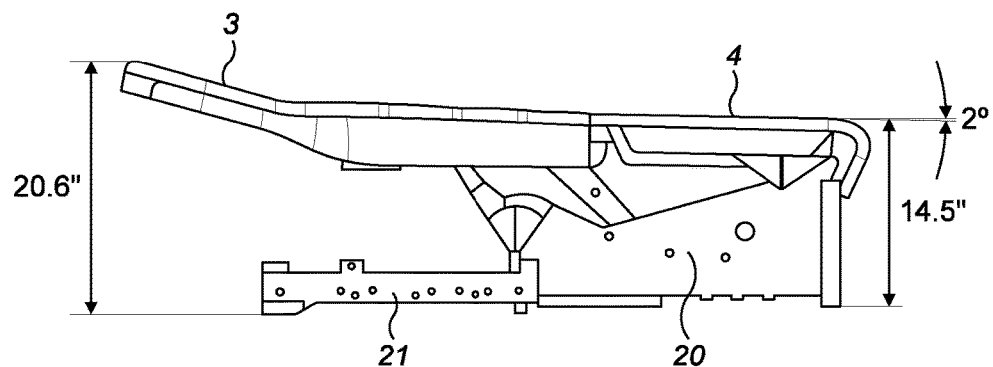

In the bed configuration as shown in FIG. 1d, the seat back 3 and the seat pan 4 are substantially horizontal and form a substantially continuous, flat surface.

Figure 2:
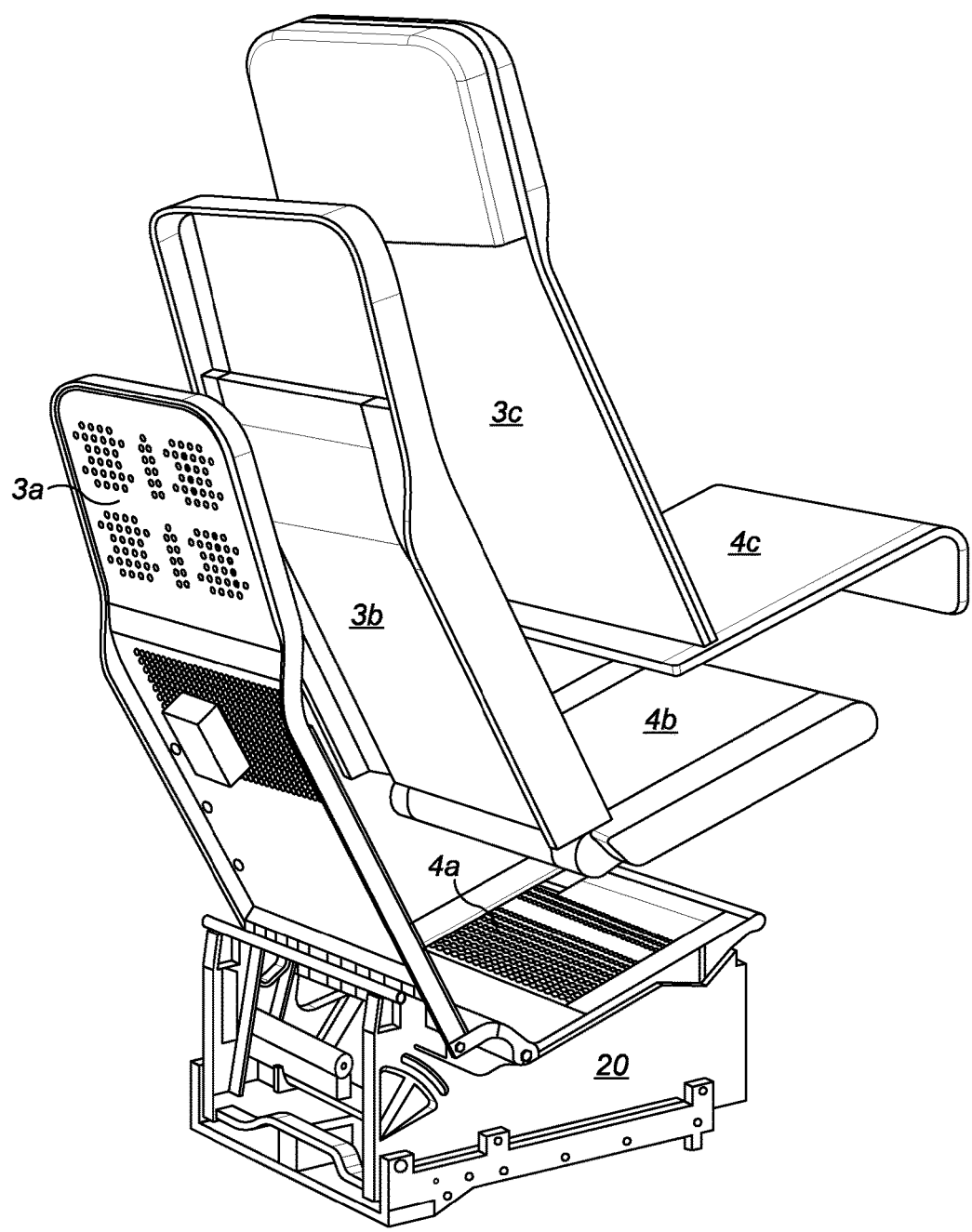
FIG. 2 is an exploded diagram of seat upholstery layers applied to the seat frame.

FIG. 2 illustrates the upholstery layers provided on the seat frame. A padding layer, comprising a seat back padding 3b and seat pan padding 4b, are provided on and secured to a seat back frame 3a and seat pan frame 4a respectively. A topper layer comprising a seat back topper 3c and a seat pan topper 4c are provided over the seat back padding 3b and seat pan padding 4b respectively.

Seat Reclining Mechanism

As described above, the mechanism for reclining the seat 1 is required to move the seat back 3 and the seat pan 4 through a complex path as they pass from the upright to the bed configuration. In particular, the seat pan 4 is required to move from a slightly rearwardly inclined position (i.e. with the forward end higher than the rearward end) in the upright configuration, to a more rearwardly inclined position in the TTOL and reclined configurations, to a substantially horizontal position in the bed configuration. In other words, the seat pan 4 first increases and then decreases its inclination as the seat back 3 reclines. The top of the seat back 3 moves substantially vertically downwards as the seat back 3 reclines, while the bottom of the seat back 3 moves forwards and remains adjacent to the rearward end of the seat pan 4. These requirements must be met with the least possible weight and sufficient strength to pass the relevant safety standards.

A mechanism for meeting these requirements was disclosed in WO 2007/072045, comprising a single actuator for driving the seat forwards and backwards, and a cam mechanism and guide track for controlling the angle of the seat back and the seat pan as the seat is driven. An alternative to that mechanism will now be disclosed, with reference to FIGS. 3 to 8; this mechanism requires separate actuators for reclining and translation, but results in a simpler and more robust mechanism.

In an embodiment of the invention, the seat structure comprises a seat frame 20 slidably mounted on a mounting bracket 21, which is fixed to the cabin floor, for example by attachment to seat rails in the cabin floor. Alternative means for fixing the mounting bracket 21 may be used, as described for example in the applicant's patent publication WO 2015/008082. The seat frame 20 is reciprocally driven relative to the mounting bracket 21 in a direction substantially parallel to the cabin floor, for example by a translation actuator (not shown) such an electric motor and a drive mechanism, such as a rack and pinion or other linear drive mechanism.

The seat pan frame 4a is pivotally attached to the seat frame 20 at a first pivot point P1, towards the front end of the seat pan frame 4a. The seat pan frame 4a is pivotally attached to the seat back frame 3a at a second pivot point P2 at or around the rearward end of the seat pan frame 4a and at or around the forward end of the seat back frame 3a. The pivotal axes of the first and second pivot points P1, P2 are substantially horizontal and transverse to the seat 1.

An extension 23 (for example in the form of an arm as shown in the Figures) is fixed to or integrally formed with the seat back frame 3a, and extends past the second pivot point P2 from the seat back frame 3a. Hence, the extension 23 and seat back frame 3a form a first order lever about the pivot point P2.

A pinion 24 is attached at or around the lower end of the extension 23. The pinion 24 is rotatably driven by a reclining actuator 30, such as an electric motor. The reclining actuator 30 may be mounted on the extension 23, with a flexible electrical connection to a power supply in the cabin floor. The pinion 24 engages a rack 25 located in or laterally adjacent a cam track or guide track 26, such that the pinion 24 follows the path of the guide track 26 as it is rotatably driven.

Figure 8:
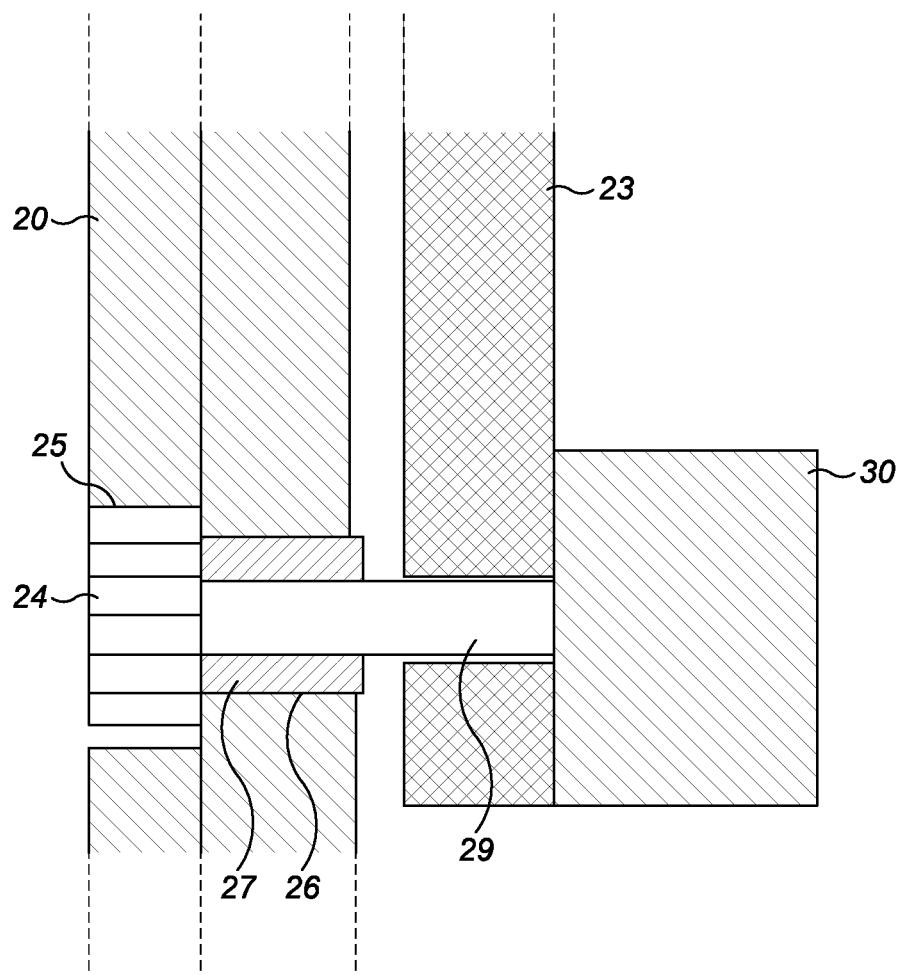
FIG. 8 is a cross-sectional diagram in a lateral vertical plane of a rack, pinion, bearing and guide track in a reclining mechanism in an embodiment.

As shown in FIG. 8, the pinion 24 is mounted on a drive axle 29 coaxially with a roller or bearing 27 that extends through and contacts the guide track 26. Preferably, the bearing 27 is freely rotatable about the drive axle 29 connecting the reclining actuator 30 to the pinion 24, so that the bearing 27 is not rotated by the drive axle 29. The bearing 27 is generally circular in cross-section and has an outer diameter substantially equal to the pitch circle diameter of the pinion 24, thus substantially reducing or removing radial load on the pinion 24. In this embodiment, the rack 25 is located adjacent an upper side of the guide track 26, to avoid dirt or debris collecting between the teeth of the rack 25, but the rack 25 may alternatively be located adjacent a lower side of the guide track 26. In that case, the bearing 27 could be omitted and the rack 25 could be provided along the lower side of the guide track, although this would increase the load on the pinion 24.

The guide track 26 has a shape that is designed to achieve the seat configurations described above. In this embodiment, the guide track 26 has a first, generally arcuate section S1 extending downwardly and forwardly from a first end E1, and a second, generally straight section S2 extending upwardly and forwardly from the first section S1 to a second end E2. The first and second sections S1, S2 form a continuous spline. Alternative shapes may be used, depending on the desired configurations of the seat 1. The guide track 26 may be provided in a guide track portion that is removably attached to the seat frame 20. Hence, the shape of the guide track 26 may be changed using different, interchangeable guide track portions, without the need to reconfigure the rest of the seat 1.

When the pinion 24 is at the first end E1, the seat back frame 3a and the rearward end of the seat pan frame 4a are raised, so that the upright configuration is adopted. As the pinion 24 is driven along the rack 25 down the guide track 26, the seat back frame 3a and pan frame 4a are reclined into the TTOL configuration, as shown for example in FIGS. 6 and 7.

Figure 3:
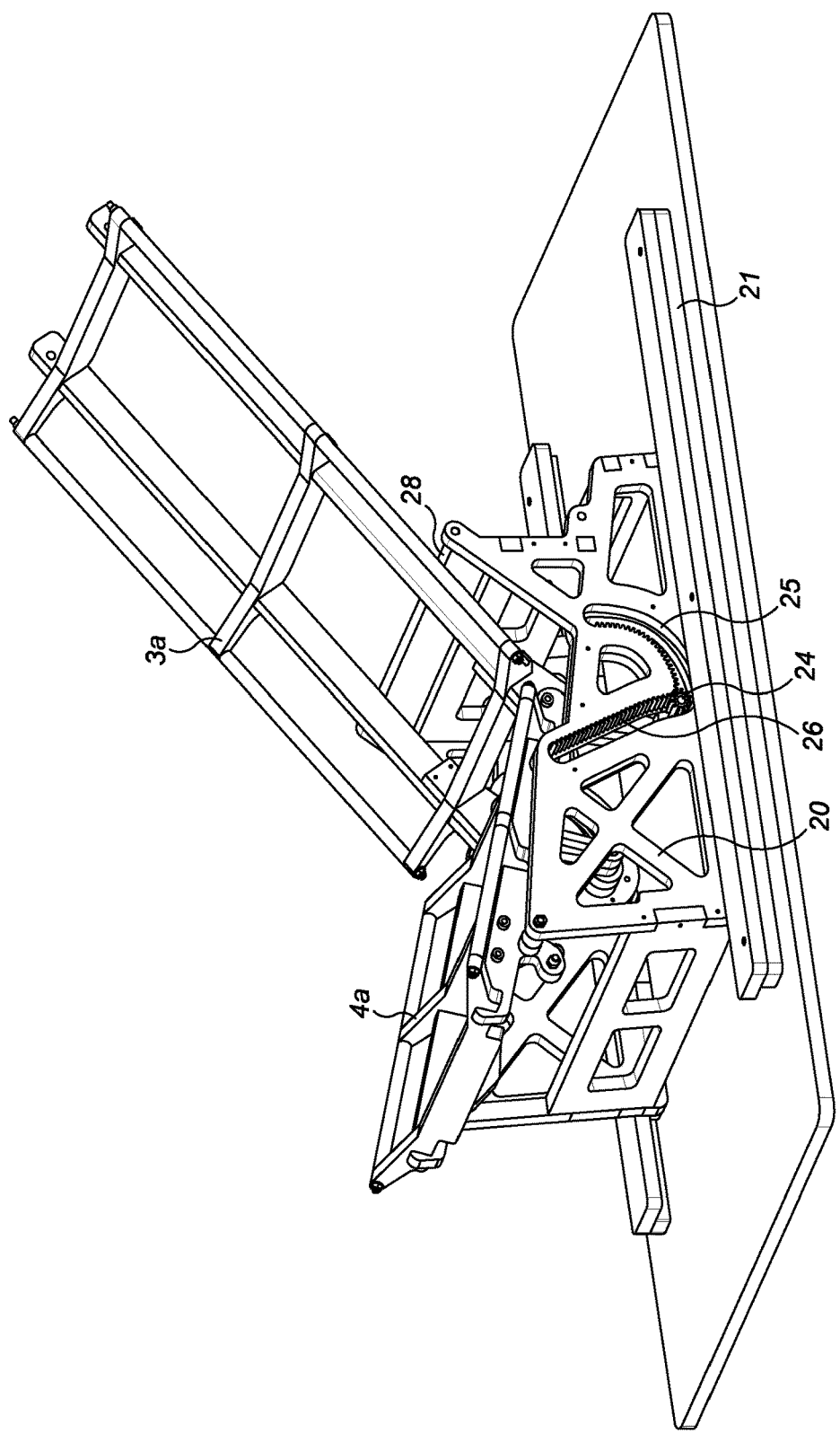
FIG. 3 is a perspective view of a seat frame with reclining mechanism, in the reclined position.
Figure 4:
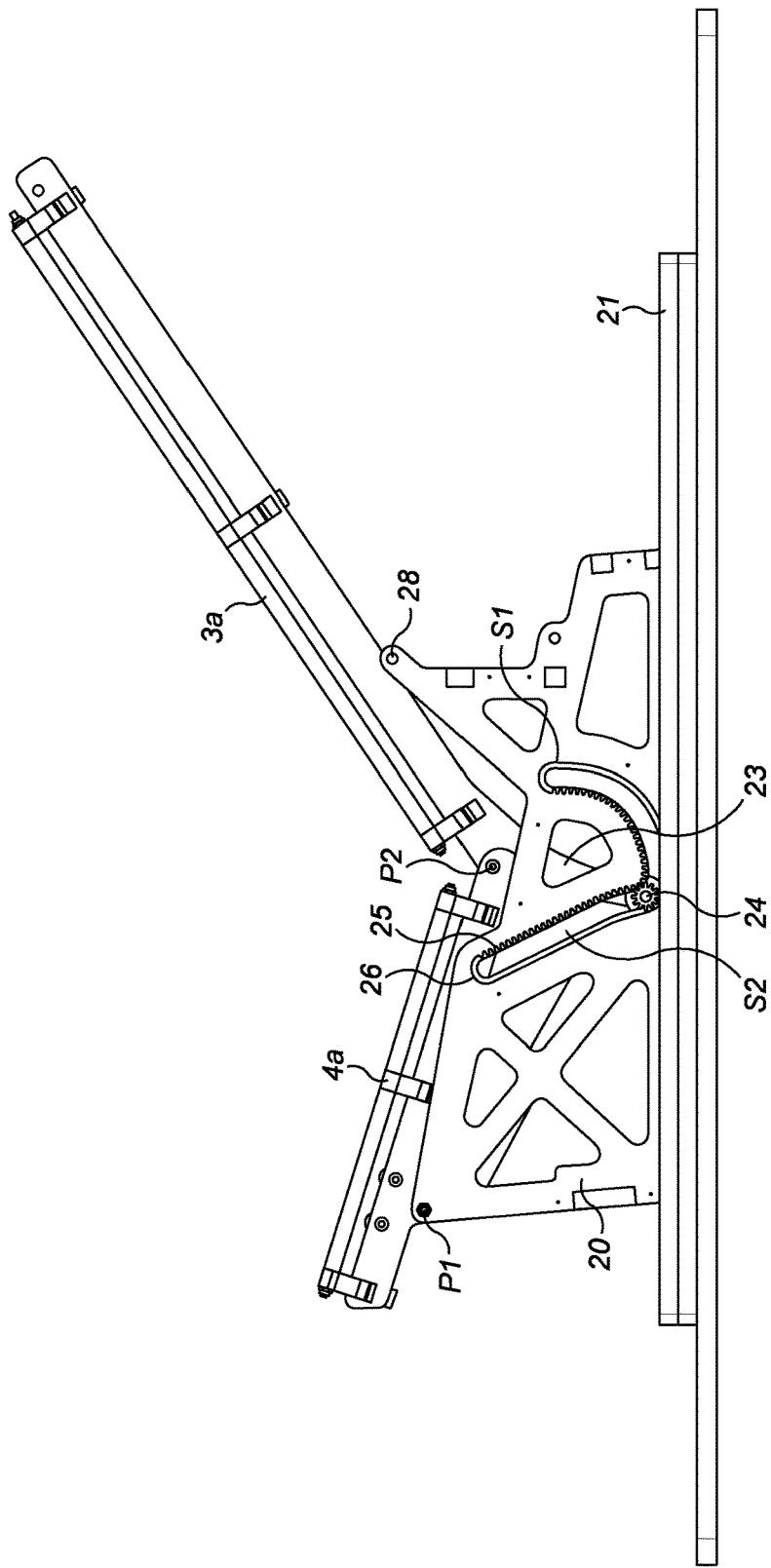
FIG. 4 is a side view of the seat frame with reclining mechanism, in the reclined position.
Figure 5:
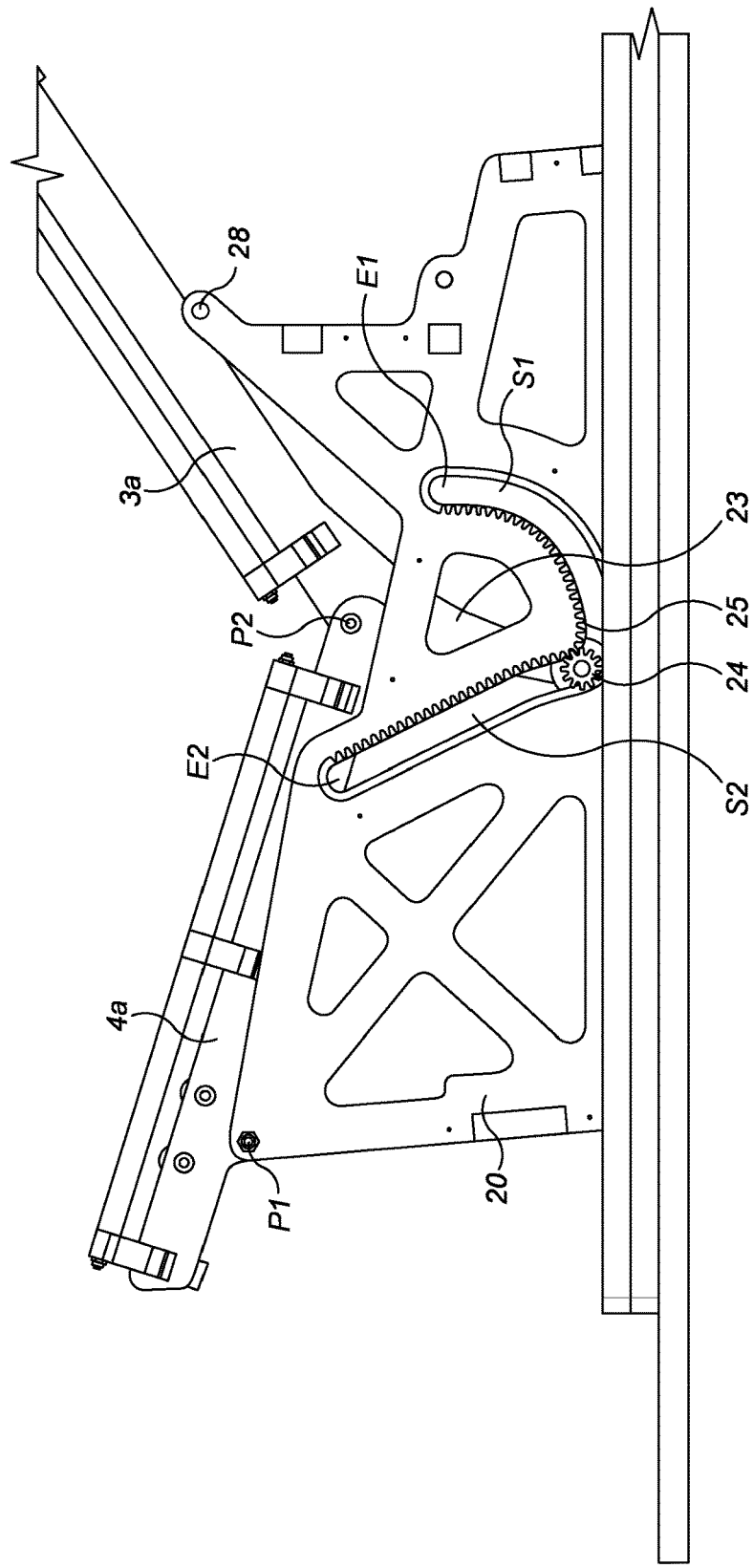
FIG. 5 is a close up view of the mechanism in FIG. 4.
Figure 6:
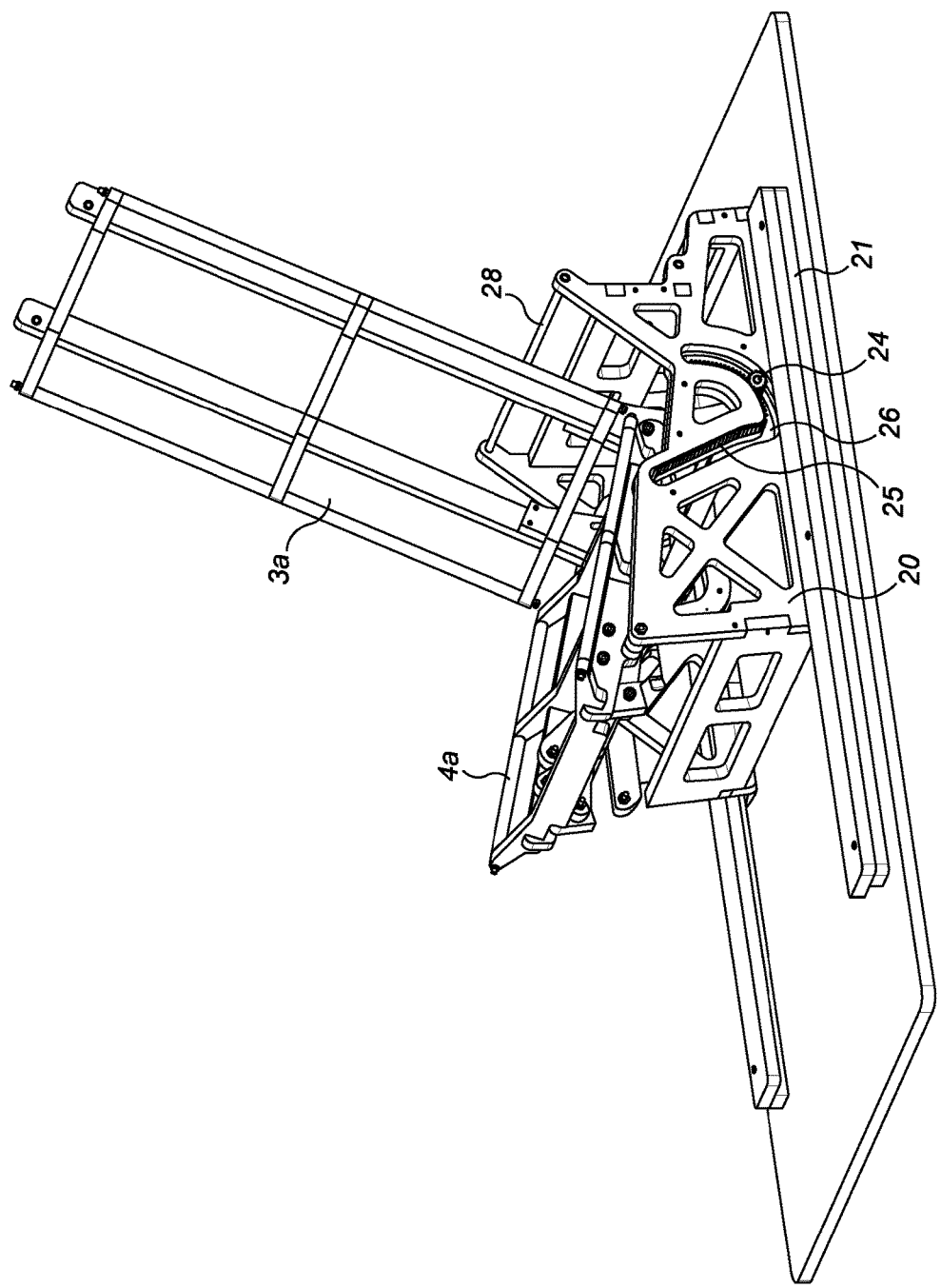
FIG. 6 is a perspective view of a seat frame with reclining mechanism, in the TTOL position.
Figure 7:
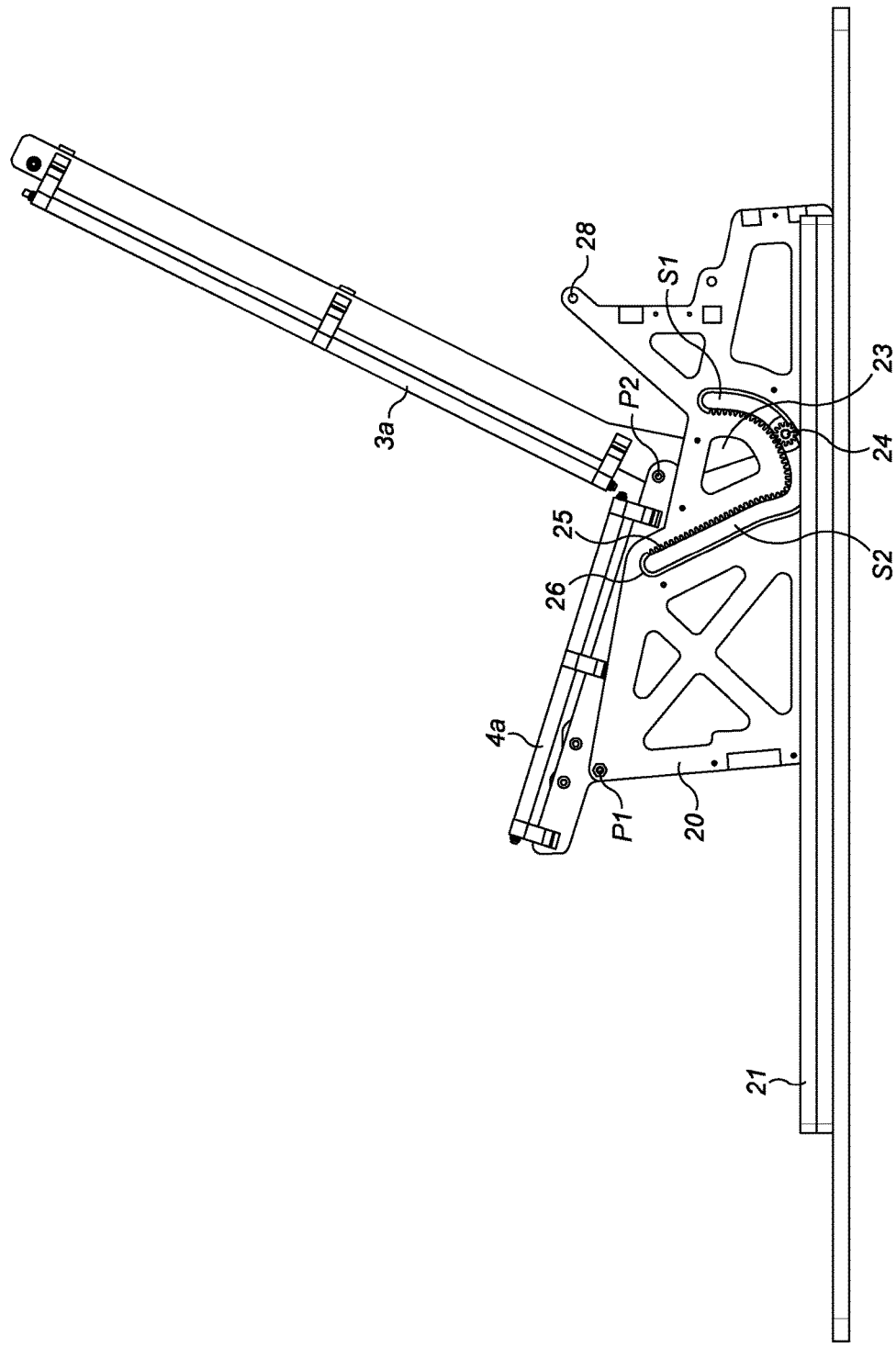
FIG. 7 is a side view of the seat frame with reclining mechanism, in the TTOL position.

As the pinion 24 is driven to the junction between the first and second sections S1, S2, the seat back frame 3a and seat pan frame 4a are reclined further into the reclined configuration, as shown for example in FIGS. 3 to 5. The seat back frame 3a reclines into contact with a support bar 28, fixed to the seat frame 20 in a position behind the seat back frame 3a. The support bar 28 provides support for the seat back frame 3a in the reclined and bed configurations, and therefore prevents excessive force from being applied to the extension arm 23 and thence to the reclining mechanism by the weight of the passenger on the seat back 3.

As the pinion 24 is driven into the second section S2, the seat back frame 3a is further reclined, in sliding contact with the support bar 28, and the rearward end of the seat pan frame 4a is lifted, into the substantially horizontal bed configuration.

The pinion 24 may be releasably connected to the reclining actuator 30, for example by a manually actuable clutch, so that the seat 1 may be moved into the TTOL configuration even if the reclining actuator 30 fails, for example on loss of power.

Alternative linear drive mechanisms to the pinion 24 and rack 25 may be employed, provided that they are able to hold the extension 23 in position and reliably drive the end of the extension 23 along the track 26. For example, a roller pinion or friction drive system may be used.

The reclining mechanism described above is particularly reliable, since the bearing is driven directly along the guide track 26 by the rack 25 and pinion 24, with the driving force applied in the direction of the guide track 26; this tends to reduce the risk of jamming. The mechanism improves safety, since it is are located below the seat back and pan frames 3a, 4a and is therefore inaccessible to the seat occupant. Moreover, the reclining mechanism does not occupy space directly under the seat pan frame 4a, thus allowing a footrest or other seat part to be retracted under the seat 1.

The first and reclining actuators are preferably controlled by a seat control unit (not shown) in coordination so that the seat frame 20 is driven forward by the translation actuator as the seat back frame 3a and seat pan frame 4a are driven by the reclining actuator 30 into the reclined and bed configurations. When the seat 1 is in the upright or TTOL configurations, the translation actuator may be controlled independently of the reclining actuator 30, to move the seat 1 forward or back, allowing passengers of different heights to use a footrest comfortably.

Alternative Embodiments

The above embodiments illustrate, but do not limit, the present invention. Alternative embodiments which may occur to the skilled reader on reading the above description may also fall within the scope of the invention.

The invention claimed is:

1. An aircraft passenger seat comprising a seat back and a seat pan, the seat pan being pivotally connected at or around a forward end thereof to a seat frame at a first pivot point, and at or around a rearward end thereof to a lower end of the seat back at a second pivot point; the seat back having an extension extending beyond the second pivot point and engaging a guide track in or connected to the seat frame, and a reclining actuator for driving the extension along the guide track so as to adjust the reclining of the seat; wherein the extension is driven by a linear drive mechanism aligned with the guide track, the linear drive mechanism comprising a pinion driven by the reclining actuator and engaging a rack arranged along the guide track.

2. The aircraft passenger seat of claim 1, wherein the rack is arranged along an upper side of the guide track.

3. An aircraft passenger seat comprising a seat back and a seat pan, the seat pan being pivotally connected at or around a forward end thereof to a seat frame at a first pivot point, and at or around a rearward end thereof to a lower end of the seat back at a second pivot point; the seat back having an extension extending beyond the second pivot point and engaging a guide track in or connected to the seat frame, and a reclining actuator for driving the extension along the guide track so as to adjust the reclining of the seat; wherein the extension is driven by a linear drive mechanism aligned with the guide track, the seat including a clutch for releasing the linear drive mechanism from the reclining actuator.

4. An aircraft passenger seat comprising a seat back and a seat pan, the seat pan being pivotally connected at or around a forward end thereof to a seat frame at a first pivot point, and at or around a rearward end thereof to a lower end of the seat back at a second pivot point; the seat back having an extension extending beyond the second pivot point and engaging a guide track in or connected to the seat frame, and a reclining actuator for driving the extension along the guide track so as to adjust the reclining of the seat; wherein the extension carries a bearing moveable along the guide track; wherein the extension is driven by a linear drive mechanism aligned with the guide track, and wherein the bearing is arranged to reduce loading on the linear drive mechanism.

5. The aircraft passenger seat of claim 1, wherein the guide track is located in the seat frame, below the lower end of the seat back.

6. An aircraft passenger seat comprising a seat back and a seat pan, the seat pan being pivotally connected at or around a forward end thereof to a seat frame at a first pivot point, and at or around a rearward end thereof to a lower end of the seat back at a second pivot point; the seat back having an extension extending beyond the second pivot point and engaging a guide track in or connected to the seat frame, and a reclining actuator for driving the extension along the guide track so as to adjust the reclining of the seat; wherein the guide track has a first section extending downwardly and forwardly from a first end, such that the seat back reclines as the part moves along the first section away from the first end.

7. The aircraft passenger seat of claim 6, wherein the first section is arcuate.

8. The aircraft passenger seat of claim 6, wherein the guide track has a second section extending upwardly and forwardly towards a second end, such that the seat back reclines and the rearward end of the seat pan is raised as the part moves along the second section towards the second end.

9. The aircraft passenger seat of claim 8, wherein the second section is substantially straight.

10. The aircraft passenger seat of claim 1, wherein the guide track is removably attached to the seat frame.

11. The aircraft passenger seat of claim 1, including a support attached to the seat frame and arranged to support the seat back in a reclined position.

12. The aircraft passenger seat of claim 11, wherein the support is arranged to slide against the seat back as the seat back reclines.

13. The aircraft passenger seat of claim 1, wherein the seat frame is slidably supported on a mounting bracket for fixing the seat to a cabin floor.

14. The aircraft passenger seat of claim 13, including a translation actuator for driving the seat frame relative to the mounting bracket.

15. The aircraft passenger seat of claim 13, including a seat controller for controlling the reclining actuator and the translation actuator.

16. The aircraft passenger seat of claim 15, wherein the seat controller is arranged to move the seat forward as the seat back is reclined.

17. The aircraft passenger seat of claim 15, wherein the seat controller is arranged to move the seat forward when the seat back is upright, independently of movement of the reclining actuator.

* * * * *